United States Patent [19]

Muska

[11] Patent Number: 4,499,609
[45] Date of Patent: Feb. 12, 1985

[54] SYMMETRICALLY CLAMPED FIBER OPTIC RECEIVER

[75] Inventor: Willis M. Muska, Roanoke, Va.

[73] Assignee: International Telephone and Telegraph Corporation, New York, N.Y.

[21] Appl. No.: 470,755

[22] Filed: Feb. 28, 1983

Related U.S. Application Data

[63] Continuation of Ser. No. 181,585, Aug. 27, 1980, abandoned.

[51] Int. Cl.³ .............................................. H04B 9/00
[52] U.S. Cl. ...................................... 455/619; 307/559; 358/171; 455/608; 455/612
[58] Field of Search ............... 455/601, 606, 607, 608, 455/610, 612, 619; 307/540, 561, 559, 565, 566; 358/171, 172, 173

[56] References Cited

U.S. PATENT DOCUMENTS 2,636,080  4/1953  Doba, Jr. ........................... 358/172
2,853,630  9/1958  Lang et al. ......................... 307/559
3,610,962  10/1971  Meyer ................................ 307/559

FOREIGN PATENT DOCUMENTS 821673  10/1959  United Kingdom ................ 358/173

OTHER PUBLICATIONS

Eppes et al., "A Two Kilometer Optical Fiber", Conf. Electromag. Wave Prop. Panel/Avionic Panel Joint Symp., London, England, May 16-20, 1977, pp. 147-149.

Primary Examiner—Joseph A. Orsino, Jr.
Attorney, Agent, or Firm—John T. O'Halloran; Peter R. Ruzek

[57] ABSTRACT

In a fiber optic receiver of the type comprising a photodetector, a preamplifier, a postamplifier and a voltage comparator for quantizing the output to a logic level signal, the improvement comprising symmetrical clamp means interposed between said postamplifier and said voltage comparator.

6 Claims, 10 Drawing Figures

EQUIVALENT SYMMETRICAL CLAMP CIRCUIT $V_i$ WAVEFORM (RECEIVED SIGNAL AT POSTAMPLIFIER OUTPUT)

$V_o$ WAVEFORM (OUTPUT VOLTAGE FROM CLAMP)

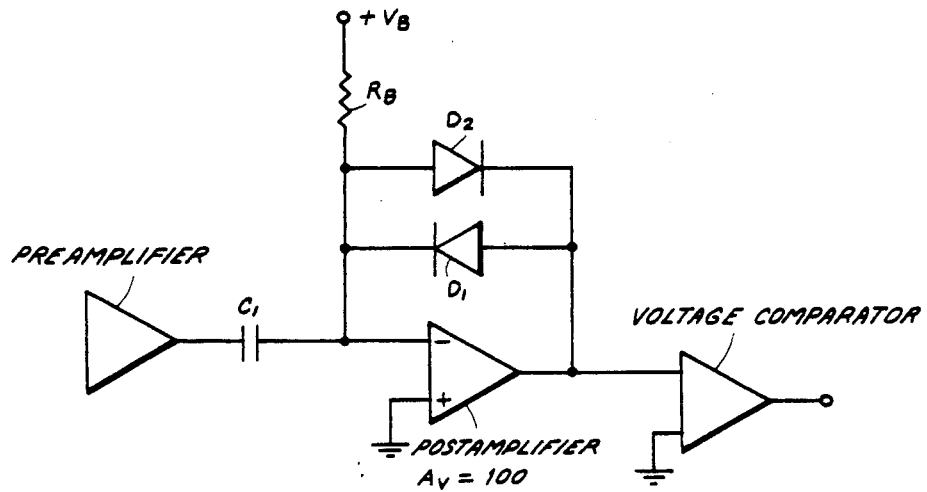
Fig. 7  FUNCTIONAL DIAGRAM OF FEEDBACK SYMMETRICAL CLAMP.
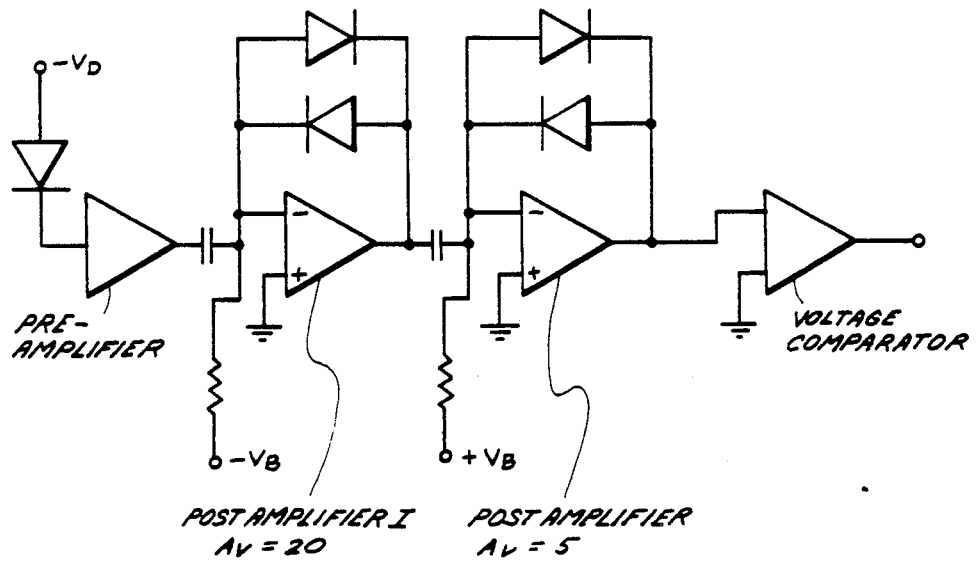
Fig. 8  TWO-STAGE CASCADED FEEDBACK IMPLIMENTATION.

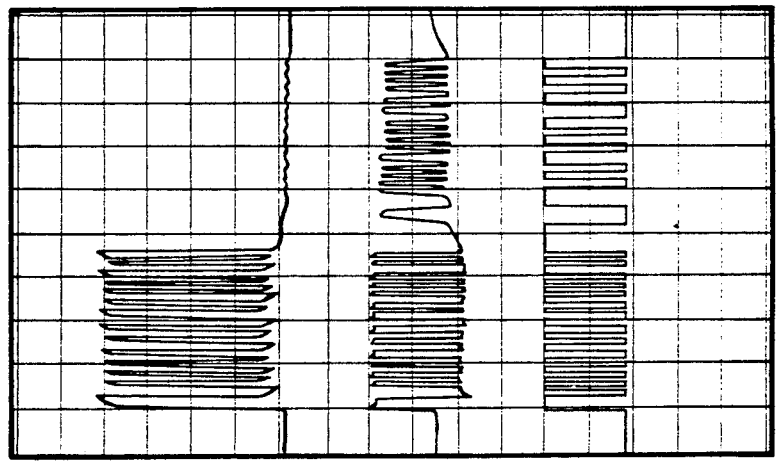
Fig. 9 OSCILLOSCOPE PICTURES
WAVEFORM AT PREAMPLIFIER OUTPUT
WAVEFORM AT OUTPUT OF FINAL SYMMETRICAL CLAMP
TTL WAVEFORM AT OUTPUT OF VOLTAGE COMPARATOR

SYMMETRICALLY CLAMPED FIBER OPTIC RECEIVER

This is a continuation of application Ser. No. 181,585, filed Aug. 27, 1980, now abandoned.

FIELD OF THE INVENTION

Data bus applications for fiber optics normally require optical receivers which provide large instantaneous dynamic range capability. Conventional receiver designs for point-to-point links are generally inadequate for these applications since their automatic gain control (agc) function takes too long to respond to large changes in received optical power level, and their ac coupling prohibits fast adaptation to changes in average optical power level. Herein is described a novel receiver design which addresses the problems that are unique to fiber-optic data buses and will service any link in which the data format restricts the maximum pulse width to no more than a few bit-times. The dc content of this data need not be restricted by scrambling or other techniques. The circuitry is simple and eliminates the need for complicated automatic gain or threshold circuitry. Receiver sensitivities can be achieved which are within 2 to 3 dB of what can be achieved for point-to-point, continuous data receivers. The term sensitivity is defined as the average optical power level at which the bit error rate is $10^{-9}$. FIG. 1 illustrates two typical bus architectures. Each receiver on a bus must be capable of faithfully detecting data transmissions from any transmitter on the bus. In some cases, it may have to receive transmissions from its own terminal transmitters. The optical power level that a receiver will receive from a given transmitter will depend upon the output power from the transmitter and the losses that exist between the transmitter and receiver. These losses may vary by as much as 20 to 30 dB. FIG. 2 illustrates the optical signals that a receiver might see. The power level from one transmitter is much larger than that from another transmitter. The data message from the second transmitter will immediately follow that from the first transmitter. If the receiver cannot respond fast enough to receive the second message, the bus protocol will have to be such that the intermessage gap time (IGT) will have to be longer. This would mean that the bus will be less efficient. The dynamic range capability of the receiver will be referred to as the optical signal range (OSR) which is defined as $-10 \log P_1/P_2$ (dB) where $P_1$ and $P_2$ are the average signal powers of a first signal ($P_1$) and a second signal ($P_2$). Conventional ac coupled receiver designs are not capable of delivering the OSR and IGT performance that is required in most fiber optic data buses. The transient response of an ac coupled receiver is shown in FIG. 3 When the average signal power increases or decreases instantaneously, it takes a finite amount of time for the analog output of the receiver to restore the signal to a level that can be detected by a threshold detector (such as a voltage comparator).

Prior receiver designs have been proposed and tested which address these problems, but they have sacrificed receiver sensitivity and/or circuit simplicity. For instance, improved agc circuits which have been designed for rapid response have become very complex. Straight ac coupled receivers sacrifice senstivity as their response time is made smaller.

OBJECTS OF THE INVENTION

It is an object of the invention to provide a fiber optic receiver having the ability to respond to larger changes in the power levels of received signals within a few bit times.

It is another object of the invention to provide a fiber optic receiver wherein a minimal degradation in receiver sensitivity is incurred relative to known receivers for continuous data communications.

Yet another object is to achieve the above objectives utilizing a simple circuit and wherein the dc component of the received signal is not restricted.

SUMMARY OF THE INVENTION

The design that is discussed herein takes advantage of the fact that most data bus protocols use data formats that restrict the maximum pulse length to two bit times or less. This usually means that a Manchester or delay code is used which gives a lot of timing information along with the data. The design of the present invention can also be used for point-to-point links in which similar codes or return-to-zero (RZ) formats are used. In the latter case, the link can handle data in which the pulses can occur at any rate, thus allowing a dc to X bit-rate link.

The agc circuit of a conventional receiver is replaced by a circuit which operates as a symmetrical clamp. This overcomes the problem of excessive response times since the symmetrical clamp is not subject to the slow response times of known agc circuits.

BRIEF DESCRIPTION OF THE DRAWINGS

FIG. 7 is a functional diagram of a feedback symmetrical clamp.

FIG. 8 is a circuit diagram for a two-stage cascaded feedback implemented clamp.

FIG. 9 is a representation of the respective preamp output, output of the final symmetrical clamp and the TTL waveform at the output of the voltage comparator.

DESCRIPTION OF THE PREFERRED EMBODIMENTS

Figure 1:
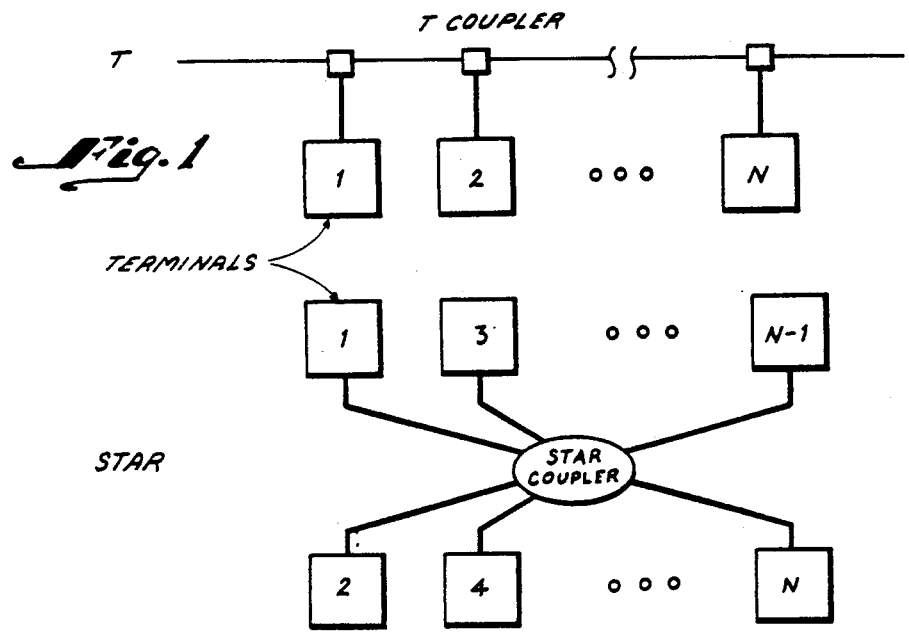
FIG. 1 illustrates generally "T" and "Star" data bus configurations.
Figure 2:
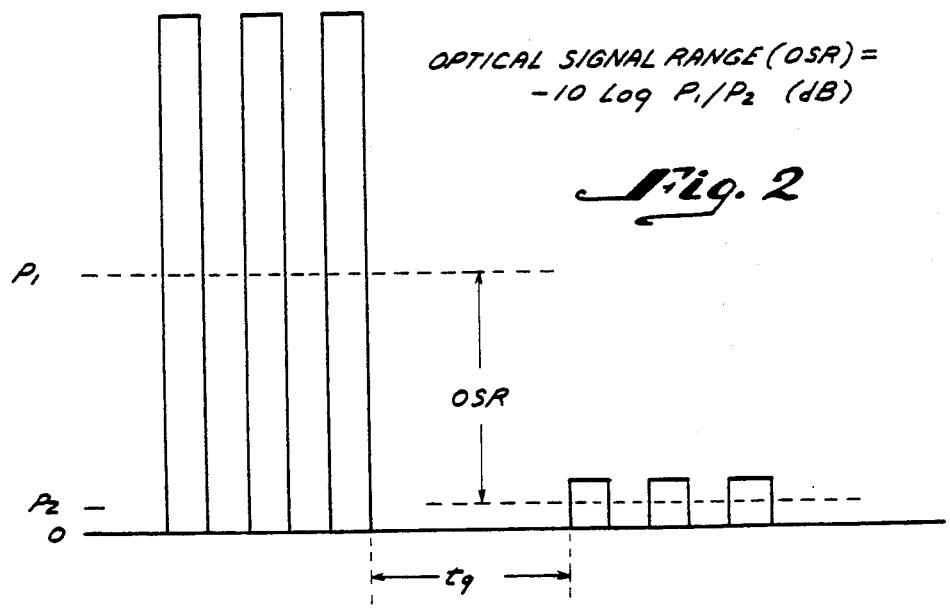
FIG. 2 illustrates the significance of intermessage dynamic range.
Figure 3:
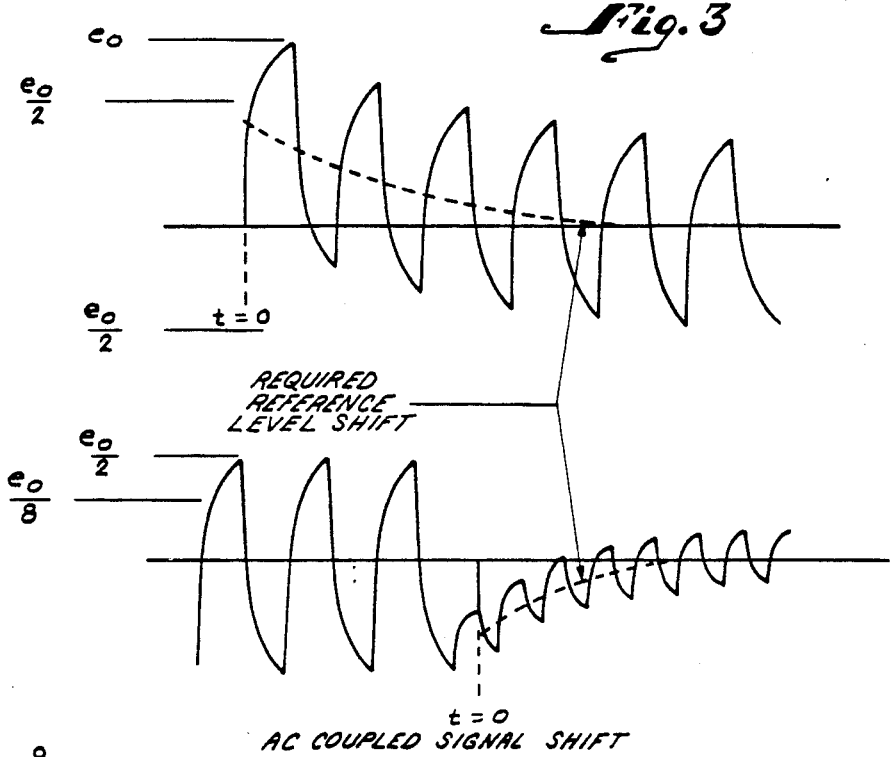
FIG. 3 illustrates an alternating current coupled signal shift.
Figure 4:
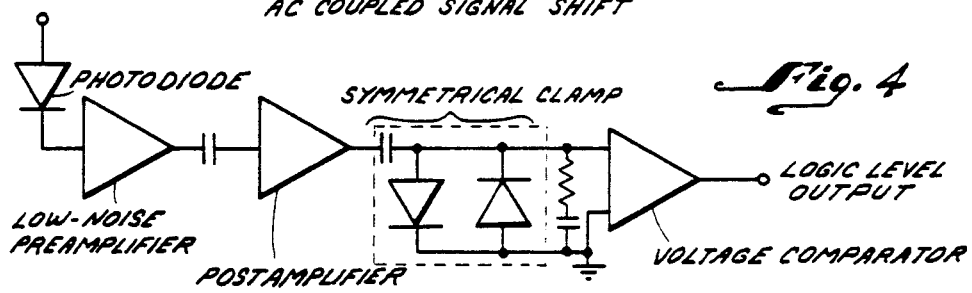
FIG. 4 is a functional diagram of a symmetrical clamp fiber-optic receiver.

FIG. 4 shows a simple, functional diagram of a receiver incorporating the invention. It differs from conventional designs in that agc circuits are replaced by a symmetrical clamp. The receiver consists of a photodetector (pin photodiode or avalanche photodiode, APD), low-noise preamplifier (which normally determines the sensitivity of the receiver), a linear postamplifier, the symmetrical clamp, and a voltage comparator which quantizes the signal to a logic level signal.

Figure 5:
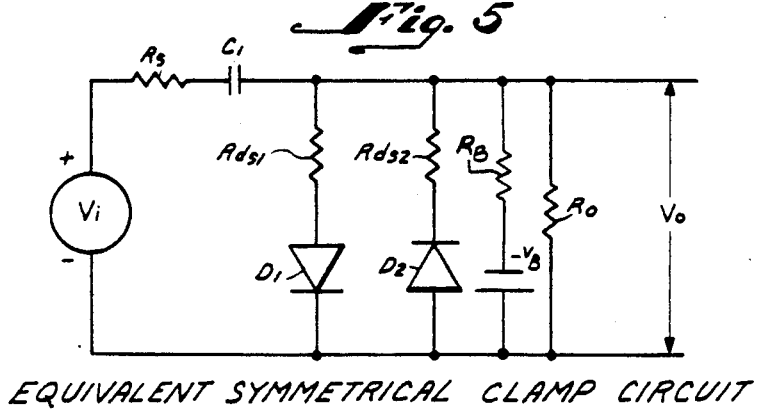
FIG. 5 is an equivalent circuit diagram for the receiver at FIG. 4.

The schematic in FIG. 5 is an equivalent circuit of the symmetrical clamp. The received signal at the output of the postamplifier is represented by $v_i$. The output impedance of this amplifier is represented by $R_s$, the diode resistance of $D_1$ by $R_{ds1}$, the diode resistance of $D_2$ by $R_{ds2}$, and the output or load resistance by $R_o$.

Figure 6A:
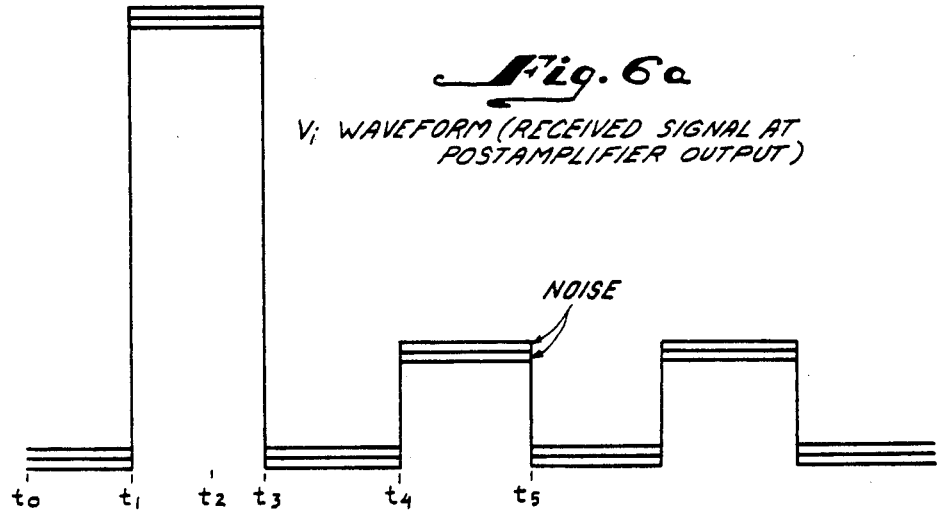
FIGS. 6 (a) and (b) respectively illustrate waveforms at the post amplifier output and the clamp outlet.
Figure 6B:
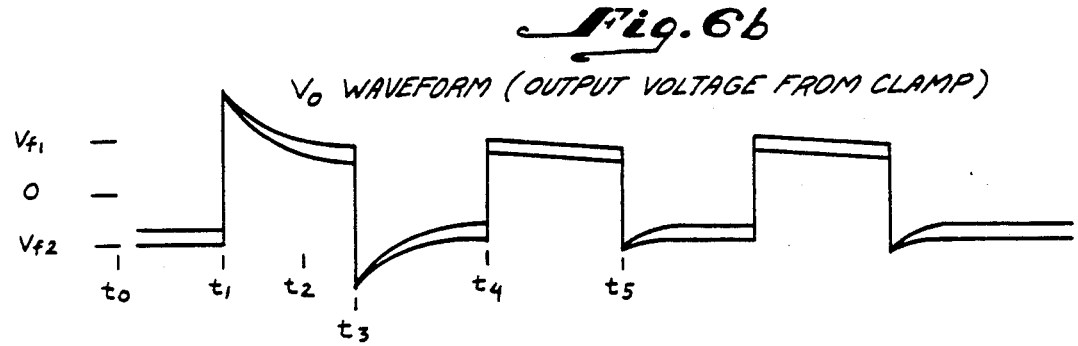

When a larger power level signal followed by a small power level signal is received, the waveform at $v_i$ may resemble FIG. 6A. From $t_0$ to $t_1$, no signal is present and $v_i$ consists of the noise that is generated in the preamplifier. If this were just applied to the symmetrical clamp, the voltage comparator (shown in FIG. 4) would quantize the noise and the output data from the receiver would be rubbish. To avoid this undesirable condition, a bias voltage might be applied to the clamp, as shown in FIGS. 4 and 5. This voltage is indicated in FIG. 5 as $-V_B$ which is applied through a resistor $R_B$. The resistor $R_B$ and voltage $-V_B$ supply a small bias current to the clamp which biases $D_2$ just into conduction. This voltage $-v_{f2}$ is below the threshold level of the voltage comparator and therefore keeps the comparator output at zero. At $t_1$, $v_i$ goes positive which takes $D_2$ out of forward bias and the diodes are effectively out of the circuit during the period prior to the time at which $v_i$ exceeds $v_{f1}$ due to their large impedance when not biased into conduction. $R_o$ is very large compared to $R_s$ and $X_c$; thus $v_o$ follows $v_i$. When $v_i$ reaches the forward bias voltage of $D_1$ ($v_{f1}$), $C_1$ charges through $R_{ds1}$ and $R_s$ to ($v_i-v_{f1}$). The time constant, $C_1 (R_{ds1}+R_s)$, and the rise time of $v_i$ determine how long this takes. The output voltage ($v_o$) resembles FIG. 6b. At $t_2$, when the voltage across $C_1$ equals ($v_i-v_{f1}$), $D_1$ ceases to be forward biased and $C_1$ charges through $R_o$ since the impedance of $D_1$ is then much larger than $R_o$. $R_B$ is typically much larger than $R_o$ and can be made much larger than $R_s+R_{ds}$; thus the decay in $v_o$ between $t_2$ and $t_3$ is very small compared to the sum of the forward turn on voltages of $D_1$ and $D_2$ ($v_{f1}+v_{f2}$). At $t_3$, $v_i$ returns to zero, $v_o$ follows $v_i$ until $D_2$ becomes forward biased and $C_1$ discharges through $R_s$ and $R_{ds2}$ until the voltage across $C_1$ equals ($v_i+v_{f2}$). At this time $D_2$ is biased by the current through $R_B$ and $v_o$ equals $-v_f$ (where $v_f=v_{f1}=v_{f2}$).

When a small signal is received at time $t_4$, $v_o$ follows $v_i$. $v_i$ never reaches the forward turn on voltage ($v_f$) of $D_1$ and $v_o$ is not clamped. Since $R_o$ is very large, the waveform droops slightly between $t_4$ and $t_5$. When $v_i$ goes negative at $t_5$, $D_2$ becomes slightly forward biased in order to make up for the small amount of charging of $C_1$ between $t_4$ and $t_5$. The net effect of this performance is to allow $v_o$ to recover quickly from very large input signals so that the circuit is ready to detect signals whose power level is at the sensitivity point of the receiver. The clamp causes little distortion in the pulse shape for small signals and distorts the amplitude of large signals to be the same as that of small signals without distorting the pulse width. The small amount of distortion of the small signals permits utilization of the maximum sensitivity available from the preamplifier.

The gain of the preamplifier and postamplifier should be such that a signal at the sensitivity point is amplified to a point whereby $D_1$ and $D_2$ are just barely driven into forward bias at the signal peaks.

The circuit values for $R_s$, $R_{ds}$, $C_1$, and $R_o$ should be optimized for the desired performance. Generally, the value of $R_s$ and $R_{ds}$ should be kept as low as possible. The capacitance of $C_1$ should be kept as low as possible while keeping the time constant of $R_oC_1$ long compared to a bit time so that it contributes little to the degradation in sensitivity performance.

The circuit described above is used to help explain the circuit theory; however, in practice, the dynamic range required from the postamplifier in the circuit of FIGS. 4 and 5 is unrealistic. The circuit in FIG. 7 solves this problem by putting the diodes in a feedback arrangement, which is termed a feedback complementary clamp. This restricts the output voltage from the postamplifier to $2v_f$ while providing the aforementioned circuit performance. Also, several stages of clamping may be used as in FIG. 8 to increase the OSR and decrease the required dynamic range in any one amplifier.

The symmetrical clamp technique described here is particularly useful for fiber optic data bus receivers. It is also very attractive for RZ and Manchester code point-to-point links. The circuit may also be useful in atmospheric optical links and in wire systems.

While we have described above the principles of our invention in connection with specific apparatus, it is to be clearly understood that this description is made only by way of example and not as a limitation to the scope of our invention as set forth in the objects thereof and in the accompanying claims.

I claim:

1. An optical receiver comprising
   photodetector means operative for converting a received optical signal into an electrical output signal;
   fixed gain amplifying means for amplifying said output signal of said photodetector means and issuing an amplified output signal;
   complementary clamping means having an input receiving said amplified output signal of said amplifying means and an output, and operative for clamping said amplified output signal to a respective one of two potential levels depending on whether said amplified output signal is above or below a predetermined potential level situated intermediate said two two potential levels and for issuing a clamped output signal at said output thereof; and
   means for quantizing said clamped output signal of said complementary clamping means.

2. The optical receiver as defined in claim 1, wherein said complementary clamping means includes a capacitor having said amplified output signal of said amplifying means supplied thereto, and two diodes arranged in opposite orientations in parallel to one another between said capacitor and said quantizing means.

3. The optical receiver as defined in claim 2, wherein said two diodes are arranged between and connected to said capacitor and a source of a reference potential.

4. The optical receiver as defined in claim 3, wherein said source of reference potential includes a voltage source and a resistor arranged in series with one another and in parallel to said two diodes between said capacitor and the ground.

5. The optical receiver as defined in claim 3, wherein said source of reference potential includes an auxiliary amplifier interposed between said capacitor and said quantizing means; and wherein said two diodes are arranged in a feedback loop around said auxiliary amplifier.

6. The optical receiver as defined in claim 5, and further comprising additional complementary clamping means similar to said clamping means and arranged in series with the latter between said amplifying means and said quantizing means.

* * * * *